US011089534B2

(12) United States Patent
Jun et al.

(10) Patent No.: US 11,089,534 B2
(45) Date of Patent: Aug. 10, 2021

(54) OPTIMIZATION OF ACCESS TECHNOLOGY SEARCH IN MULTIPLE EQUIVALENT HOME PUBLIC LAND MOBILE NETWORK (EHPLMN) DEPLOYMENTS

(71) Applicant: AT&T INTELLECTUAL PROPERTY I, L.P., Atlanta, GA (US)

(72) Inventors: Jerry Jun, Austin, TX (US); Inderpreet Ahluwalia, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 50 days.

(21) Appl. No.: 16/208,249

(22) Filed: Dec. 3, 2018

(65) Prior Publication Data
US 2020/0178153 A1 Jun. 4, 2020

(51) Int. Cl.
*H04W 40/24* (2009.01)
*H04W 40/20* (2009.01)
(Continued)

(52) U.S. Cl.
CPC .......... *H04W 40/248* (2013.01); *H04W 8/18* (2013.01); *H04W 40/20* (2013.01); *H04W 48/20* (2013.01); *H04W 76/11* (2018.02); *H04W 84/042* (2013.01)

(58) Field of Classification Search
CPC ..... H04W 40/248; H04W 40/20; H04W 8/18; H04W 48/20; H04W 76/11;
(Continued)

(56) References Cited

U.S. PATENT DOCUMENTS

| 8,116,766 | B2 | 2/2012 | Muller |
| 8,364,199 | B2 | 1/2013 | Xue et al. |

(Continued)

FOREIGN PATENT DOCUMENTS

| CN | 205336545 U | 6/2016 |
| WO | 2007045183 A1 | 4/2007 |

(Continued)

OTHER PUBLICATIONS

US 9,510,278 B2, 11/2016, Zhang et al. (withdrawn)
(Continued)

*Primary Examiner* — Hassan A Phillips
*Assistant Examiner* — Mohammed S Chowdhury
(74) *Attorney, Agent, or Firm* — Amin, Turocy & Watson, LLP

(57) ABSTRACT

Communication systems can enhance customer experience by quickly and efficiently associating and disassociating radio access technologies (RATs) from available networks in a deployment. In one aspect, a user equipment (UE) can optimize usage of a PLMN selector file (e.g., HPLMN-wACT) stored within the subscriber identity module (SIM) that comprises a combination of mobile country code/mobile network code (MCC/MNC) data and RAT data (e.g., customized based on mobile network operator (MNO) requirements and/or deployments). Moreover, during PLMN selection, the UE can only search for a RAT that is associated with a MCC/MNC combination, resulting in faster PLMN selection and reduced UE resource consumption. Further, the PLMN selector file can be modified based on MNO preferences via an over-the-air update.

20 Claims, 11 Drawing Sheets

(51) Int. Cl.
*H04W 76/11* (2018.01)
*H04W 8/18* (2009.01)
*H04W 48/20* (2009.01)
*H04W 84/04* (2009.01)

(58) Field of Classification Search
CPC ............... H04W 84/042; H04W 28/08; H04W 28/0819; H04W 48/18; H04W 48/16; H04L 47/823
USPC .......................................................... 370/329
See application file for complete search history.

(56) References Cited

U.S. PATENT DOCUMENTS

| | | | |
|---|---|---|---|
| 8,446,885 B2 | 5/2013 | Chin et al. | |
| 8,570,875 B2 | 10/2013 | Venugopal et al. | |
| 8,977,263 B2 | 3/2015 | Chin et al. | |
| 9,025,603 B2 | 5/2015 | Schrum | |
| 9,125,146 B1* | 9/2015 | Edara | H04W 48/16 |
| 9,253,714 B2 | 2/2016 | Lou et al. | |
| 9,402,227 B2 | 7/2016 | Edara | |
| 9,686,736 B2 | 6/2017 | Baratam et al. | |
| 9,699,719 B2 | 7/2017 | Ni et al. | |
| 9,900,245 B2 | 2/2018 | Shukla et al. | |
| 9,942,156 B1 | 4/2018 | Zhou et al. | |
| 2007/0191006 A1* | 8/2007 | Carpenter | H04W 48/16 455/435.2 |
| 2010/0142421 A1* | 6/2010 | Schlicht | H04W 28/021 370/310 |
| 2011/0124335 A1 | 5/2011 | Martin et al. | |
| 2012/0309391 A1 | 12/2012 | Zhang et al. | |
| 2015/0351021 A1* | 12/2015 | Zhang | H04W 48/18 455/432.1 |
| 2017/0041866 A1* | 2/2017 | Sharma | H04W 48/18 |
| 2017/0048855 A1* | 2/2017 | Garg | H04W 48/16 |
| 2017/0215227 A1 | 7/2017 | Duan et al. | |
| 2017/0238167 A1 | 8/2017 | Zhang et al. | |
| 2017/0250866 A1* | 8/2017 | Brito | H04W 24/02 |
| 2017/0339619 A1* | 11/2017 | Meylan | H04W 36/14 |
| 2017/0366962 A1* | 12/2017 | Kim | H04W 48/16 |
| 2018/0063774 A1 | 3/2018 | Gupta et al. | |
| 2018/0124814 A1* | 5/2018 | Breuer | H04W 72/0453 |
| 2018/0242229 A1 | 8/2018 | Ahluwalia | |
| 2018/0255449 A1 | 9/2018 | Gonzalez et al. | |
| 2020/0067793 A1* | 2/2020 | Dribinski | H04W 4/40 |
| 2020/0084741 A1* | 3/2020 | Chun | H04W 60/00 |

FOREIGN PATENT DOCUMENTS

| | | |
|---|---|---|
| WO | 2009135991 A1 | 11/2009 |
| WO | 2011009210 A1 | 1/2011 |
| WO | 2016005795 A1 | 1/2016 |
| WO | 2017080623 A1 | 5/2017 |

OTHER PUBLICATIONS

IEEE Autonomous Heterogeneous Networks Discovery Technique; Raziq Yaqub, Tao Zhang, 2006 (Year: 2006).*
"SIMalliance LTE UICC profile" Simalliance, [http://www.simalliance.org/en/resources/recommendations/], 2013, 34 pages.
Arkko, et al. "Network discovery and selection problem", RFC 5113. Jan. 2008, 39 pages.

* cited by examiner

OPTIMIZATION OF ACCESS TECHNOLOGY SEARCH IN MULTIPLE EQUIVALENT HOME PUBLIC LAND MOBILE NETWORK (EHPLMN) DEPLOYMENTS

TECHNICAL FIELD

The subject disclosure relates to wireless communications, e.g., optimization of access technology search in multiple equivalent home public land mobile network (EHPLMN) deployments.

BACKGROUND

As mobile network operators (MNOs) grow their footprint both domestically and internationally, for example, by incorporating and/or enabling multiple core network functions, the ability for a user equipment (UE) to quickly access the most preferred network becomes increasingly complicated. To allow the MNO to provide multiple public land mobile networks (PLMNs) that are to be treated as a home PLMN (HPLMN), 3rd Generation Partnership Project (3GPP) has defined an equivalent HPLMN (EHPLMN) file that comprises a list of PLMNs that can be used by a UE for PLMN selection and/or cell selection/reselection. Moreover, EHPLMN can be used to allow different networks with different PLMNs to all be treated as a HPLMN. This allows for quicker access to the network in cell-border and/or roaming scenarios and ensures that, through network selection criteria, the PLMNs listed as an EHPLMN will be considered as the most preferred PLMN (e.g., having highest priority).

During PLMN selection, conventional UEs search for the same set of radio access technologies (RATs), in an order defined within the subscriber identity module (SIM), for each EHPLMN entry. However, oftentimes the networks considered as equivalent HPLMNs have different deployments and can be geographically adjacent to one other. Thus, the UEs can search for RAT/PLMN combinations that do not exist at a particular location, expending both time and battery life of the UEs and resulting in customer dissatisfaction.

DETAILED DESCRIPTION

Figure 1:
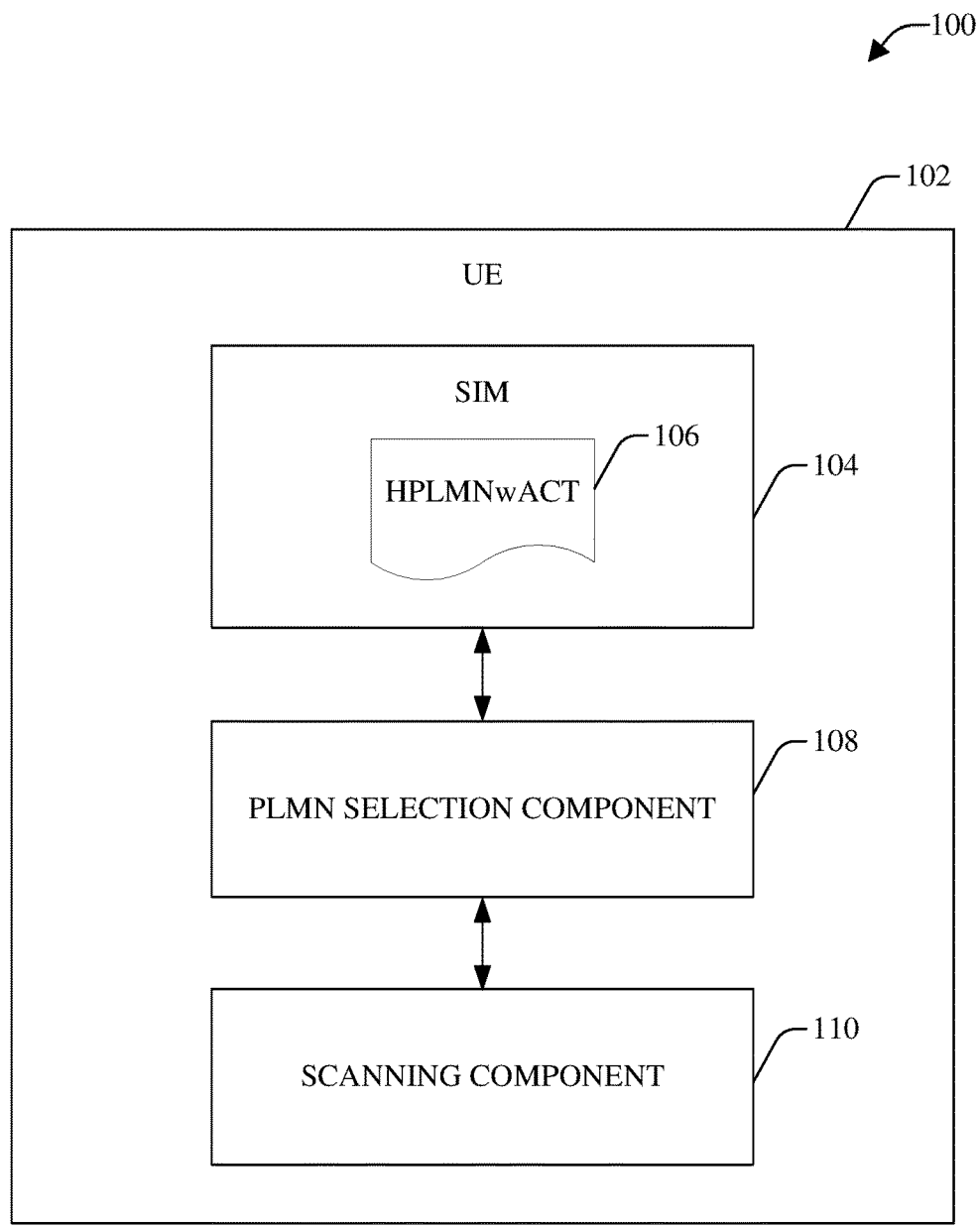
FIG. 1 illustrates an example is an example system that facilitates efficient public land mobile network (PLMN) selection.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

The systems and methods disclosed herein relate to enhancing customer experience by enabling quick and efficient association and/or disassociation of radio access technologies (RATs) from available networks in a deployment. In one aspect, a user equipment (UE) can optimize usage of a PLMN selector file (e.g., HPLMNwACT) stored within the subscriber identity module (SIM) that comprises a combination of mobile country code/mobile network code (MCC/MNC) data and RAT data (e.g., that has been customized based on mobile network operator (MNO) requirements and/or deployments). Moreover, during PLMN selection, the UE can only search for RATs that are associated with each MCC/MNC combination resulting in faster PLMN selection and accordingly, conserving computing and/or battery resources of the UE.

Aspects or features of the disclosed embodiments can be exploited in substantially any wireless communication technology. Such wireless communication technologies can include universal mobile telecommunications system (UMTS), and/or long term evolution (LTE), code division multiple access (CDMA), Wi-Fi, worldwide interoperability for microwave access (WiMAX), general packet radio service (GPRS), enhanced GPRS, third generation partnership project (3GPP), LTE, third generation partnership project 2 (3GPP2) ultra mobile broadband (UMB), high speed packet access (HSPA), evolved high speed packet access (HSPA+), high-speed downlink packet access (HSDPA), high-speed uplink packet access (HSUPA), Zigbee, or another IEEE 802.XX technology. Additionally, substantially all aspects disclosed herein can be exploited in legacy telecommunication technologies and/or next generation networks (e.g., 5G).

As used herein, "5G" can also be referred to as New Radio (NR) access. Accordingly, systems, methods, and/or machine-readable storage media for facilitating improved communication coverage for 5G systems are desired. As used herein, one or more aspects of a 5G network can comprise, but is not limited to, data rates of several tens of megabits per second (Mbps) supported for tens of thousands of users; at least one gigabit per second (Gbps) offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Referring initially to FIG. 1, there illustrated is an example system 100 that facilitates efficient PLMN selection, according to one or more aspects of the disclosed subject matter. Moreover, system 100 comprises a UE 102 that can reduce power consumption and time to access a network based on utilizing operator-controlled RAT-PLMN combinations during network scans. As an example, the UE 102 can comprise, but is not limited to most any industrial automation device and/or consumer electronic device, for example, a tablet computer, a digital media player, a wearable device, a digital camera, a media player, a cellular phone, a personal computer, a personal digital assistant (PDA), a smart phone, a laptop, a gaming system, set top boxes, home security systems, an Internet of things (IoT) device, a connected vehicle, at least partially automated vehicle (e.g., drones), etc.

Typically, PLMNs are indicative of a specific network and its country of origin. A UE (e.g., UE 102) operates on its home PLMN (HPLMN) that is determined based on its international mobile subscriber identity (IMSI). To allow provision for multiple HPLMN codes, equivalent home PLMN (EHPLMN) data can be stored within the SIM (e.g., SIM 104). In one example, the EHPLMN data comprises a prioritized list of PLMN codes that replace (and/or can be utilized in addition to) the HPLMN code derived from the IMSI for PLMN selection. In one example, during network acquisition, an acquired network can have a different PLMN than that of a mobile network operator (MNO) and accordingly, the MNO can simply add the PLMN of the acquired network to the EHPLMN list and enable UEs to prioritize connection to the acquired network (e.g., over other user-defined and/or visitor networks).

During initialization (e.g., power up and/or re-registration after leaving a connected mode), UE 102 selects the HPLMN or highest priority EHPLMN. For example, the UE 102 can utilize the EHPLMN data to determine the PLMNs that are to be accessed. In addition, a "PLMN Lists with Access Technology" file (e.g., HPLMNwACT 106) comprises radio access technologies that are to be scanned, can be utilized. Although the "PLMN Lists with Access Technology" file comprises combinations of PLMN codes (e.g., mobile country code/mobile network code (MCC/MNC) data) with respective RATs, conventional UEs merely utilize the RATs listed in the file. In other words, conventional UEs ignore the MCC/MNC data stored within the HPLMN-wACT file 106. Specifically, conventional UEs determine the set of RATs listed in the HPLMNwACT file 106 and search for the entire set of RATs for each PLMN code listed in the EHPLMN data. This can be a time and resource consuming process resulting in reduced battery life and negative customer experience. Further, the list of EHPLMNs can be deployed in different or same areas and use different RATs at different locations. Conventional UEs do not determine RATs that apply to specific EHPLMN at a particular location.

In contrast, UE 102 utilizes a PLMN selection component 108 that determines combinations of PLMNs with their corresponding RATs to facilitate an efficient PLMN search process. As an example, a default list of PLMNs with their corresponding RATs can initially be stored within the HPLMNwACT file 106 (e.g., during manufacture) and can be updated, based on most any operator preferences and/or requirements (e.g., traffic steering, load balancing, etc.), via an over-the-air (OTA) message. According to an embodiment, the PLMN selection component 108 can instruct a scanning component 110 to search for PLMN and RAT combinations based on a priority specified within the HPLMNwACT file 106. Since the scanning component 110 only searches for a RAT that is associated with the PLMN (as specified by the HPLMNwACT file 106), the scanning process is significantly expedited, consumes fewer resources, and thus, extends battery life. Once a cell with one of the PLMN and RAT combinations is found, the UE can initiate attachment procedure to camp onto the cell. In other words, the searching on RATs that are not linked to the PLMN is prohibited.

Figure 2:
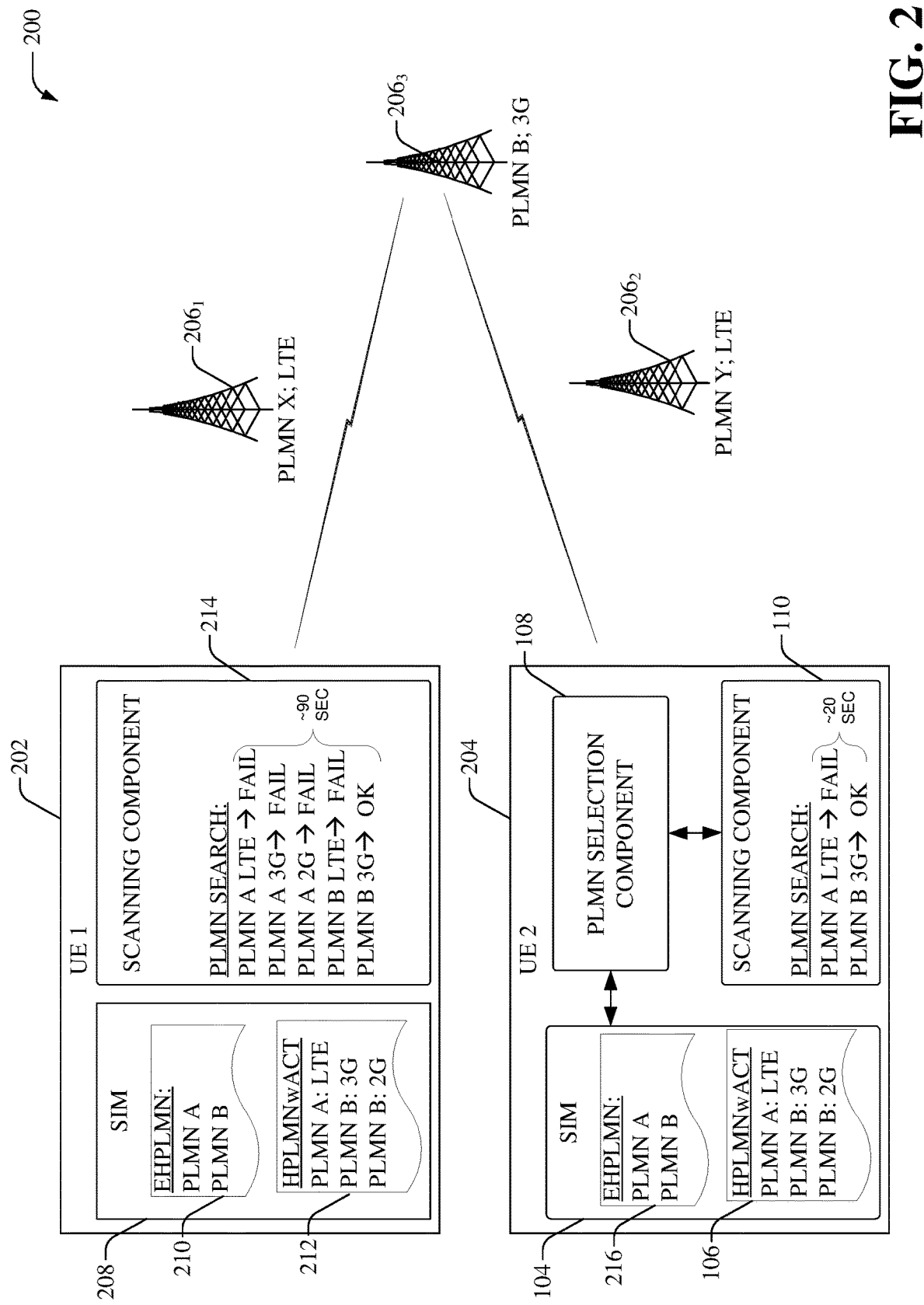
FIG. 2 illustrates an example system that comprises a user equipment (UE) that can perform optimized PLMN selection, in accordance with an aspect of the subject disclosure.

Referring now to FIG. 2, there illustrated is an example system 200 that comprises a UE (e.g., UE 2 204) that can perform optimized PLMN selection, in accordance with an aspect of the subject disclosure. Moreover, system 200 illustrates an example scenario, wherein UE 1 202 performs a non-optimized PLMN search (e.g., conventional search), while UE 2 204 performs an optimized PLMN search based on network-controlled RAT-PLMN combinations. It is noted that UE 2 204 is substantially similar to UE 102 and comprise functionality as more fully described herein, for example, as described above with regard to UE 102.

In this example scenario, both UEs (e.g., UE 1 and UE 2) can be powered on within a coverage area of cells $206_1$-$206_3$. As an example, cell $206_1$ broadcasts PLMN X and utilizes LTE as a RAT; cell $206_2$ broadcasts PLMN Y and utilizes LTE as a RAT; and cell $206_3$ broadcasts PLMN B and utilizes 3G as a RAT. Although only three cells are depicted in the figure, it is noted that the subject disclosure is not limited to three cells and can have fewer or greater number of cells that utilize most any PLMN and/or RAT.

When UE 1 202 powers on, the UE 1 202 can determine that the EHPLMN file 210 within the SIM 208 has two entries, namely, PLMN A and PLMN B. Further, UE 1 202 detects that the HPLMNwACT file 212 has a list of three RATs, namely LTE, 3G, and 2G. It is noted that although PLMN data is stored within the HPLMNwACT file 212, the UE 1 202 does not use this data for PLMN selection. Instead, scanning component 214 performs a search for all the RATs in the priority order specified within the HPLMNwACT file 212 for each PLMN listed in the EHPLMN file 210. Thus, scanning component 214 performs a search for LTE, 3G, and 2G on PLMN A, followed by a search for LTE on PLMN B which fail (e.g. since UE 1 is not within their coverage areas). Eventually, UE 1 202 searches for 3G on PLMN B and detects the PLMN B 3G cell $206_3$. This search process is inefficient and time consuming (e.g., it can take around 90 secs for UE 1 202 to detect the cell $206_3$). Moreover, scan times for each RAT can be different (e.g., 2G and/or 3G scans take longer than LTE scans) and thus, the time taken to detect PLMNs can significantly increase based on the RATs listed in the HPLMNwACT file 212.

To avoid these issues and optimize PLMN searches, UE 2 204 can utilize PLMN selection component 108 that determines the two PLMNs listed in the EHPLMN file 216 and based on the RAT-PLMN combinations stored within the HPLMNwACT file 106, determines that PLMN A is only associated with LTE and that PLMN B is only associated with 3G and 2G. Accordingly, the PLMN selection component 108 can instruct the scanning component 110 to search only for the determined RAT-PLMN combinations in the priority order listed by the file 106 (e.g., PLMN A LTE, then PLMN B 3G, and then PLMN B 2G). Accordingly, the scanning component 110 only performs one search for LTE on PLMN A before performing a search for PLMN B 3G, which results in detection of the PLMN B 3G cell $206_3$. Since the number of searches performed before detection of a cell is significantly minimized, time for network detection/access is reduced (e.g., it can take around 20 secs for UE 2 204 to detect the cell $206_3$), resource consumption is significantly reduced, and battery life is extended.

Figure 3:
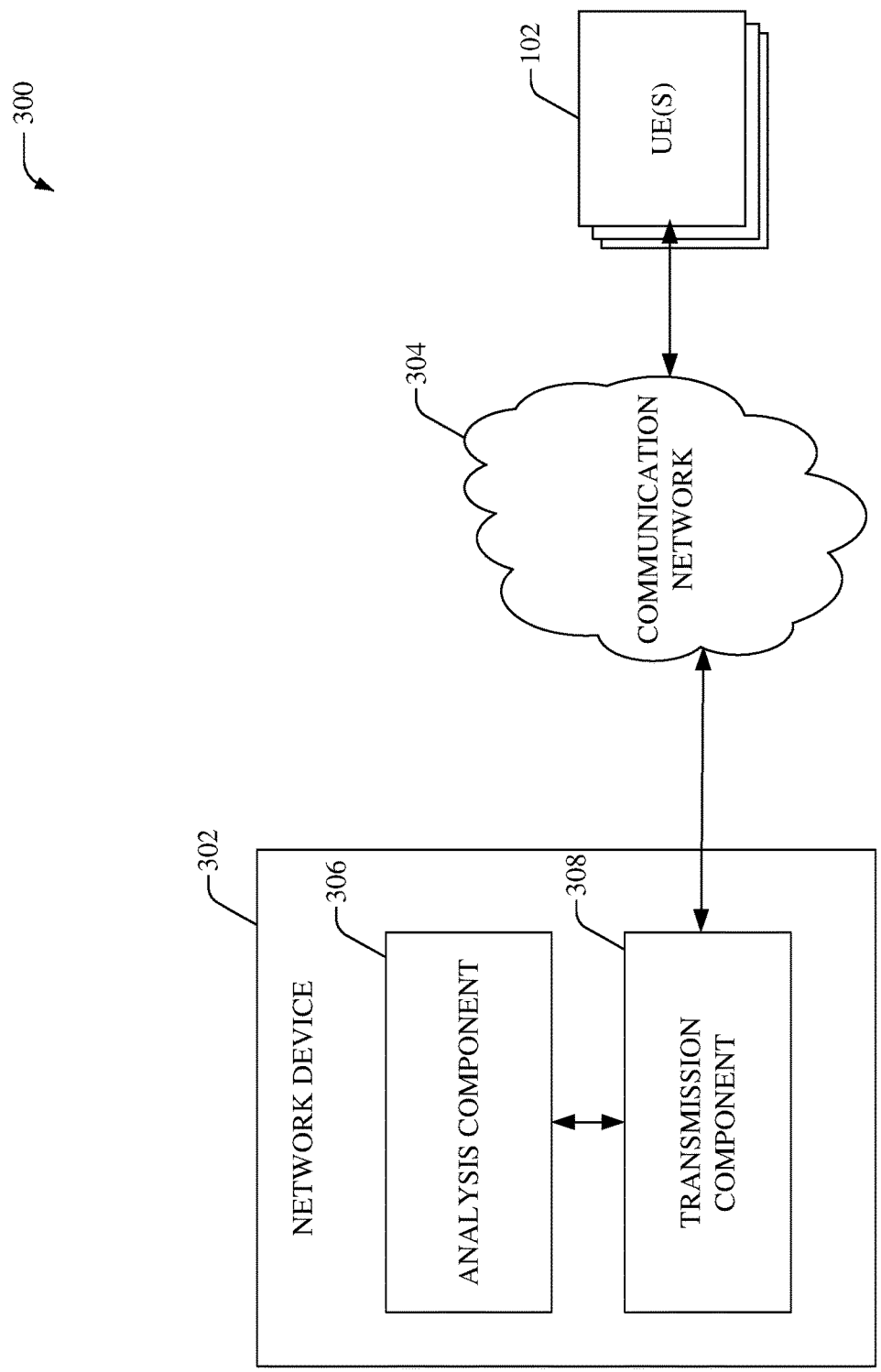
FIG. 3 illustrates an example system that facilitates control and/or prioritization of radio access technology (RAT)-PLMN combinations that are utilized during PLMN selection.

Referring now to FIG. 3, there illustrated is an example system 300 that facilitates control and/or prioritization of RAT-PLMN combinations that are utilized during PLMN selection, in accordance with an aspect of the subject disclosure. Typically, during manufacture, UE 102 can be provisioned with default values for RAT-PLMN combinations, for example, stored within the HPLMNwACT file in the SIM of UE 102. However, the MNO can update the stored values at most any time (e.g., periodically, in response to an event, on demand, etc.) via an OTA update. In one aspect, network device 302 can determine the update based on an analysis of network-related data, such as, but not limited to, operator requirements and/or preferences, operator-defined policies, network usage and/or traffic patterns (e.g., observed and/or predicted), network acquisition and/or integration data, etc. In one example, the network device 302 can comprise most any core network and/or radio access network (RAN) device, for example, a network controller, an access point (e.g., eNodeB, gNodeB, etc.), network gateway device, or any number of other network components of a communication network 304 (e.g., cellular network).

According to an embodiment, an analysis component 306 can collect and/or access the network-related data from one or more network data stores and/or devices (not shown) (e.g., in a push or pull configuration). As an example, the analysis component 306 can evaluate the network-related data to optimize and update the RAT-PLMN combinations and/or their priorities. Further, the analysis component 306 can select a UE or a group of UE (e.g., UE 102), to which the updated data is to be transferred. As an example, the analysis component 306 can utilize one or more selection criteria, such as but not limited to, UE location, UE classification/type of UE (e.g., IoT devices, mobile phones, wearable devices, connected cars, etc.), UE traffic patterns, etc. In one aspect, the analysis component 306 can determine updated RAT-PLMN combinations for a select group of UEs to facilitate load balancing and/or traffic steering (e.g., triggering UEs to move from one EHPLMN to another EHPLMN and/or keeping UEs off a specific RAT per PLMN). In another aspect, the analysis component 306 can determine updated RAT-PLMN combinations to limit PLMN scans to a single RAT per EHPLMN and then (e.g., after a defined time period) further update RAT-PLMN combinations for different groups of UEs to push the different groups of UEs to different RATs based on reselection parameters. This can enhance scan time by limiting search to a single RAT and ensure that a legacy technology exists before being pushed to a newer technology (e.g., ensure circuit switched fallback is an available option in an area).

In yet another aspect, the analysis component 306 can determine updated RAT-PLMN combinations for a select group of UEs to enable and/or disable scanning of legacy and/or non-legacy RATs (e.g., LTE, LTE-M, NB-IoT, etc. which are considered "LTE" RATs but have different scanning requirements). Additionally, or alternatively, the analysis component 306 can determine updated RAT-PLMN combinations to enable quicker scanning for HPLMNs in border scenarios before moving on to PLMN scanning based on other operator and/or user controlled PLMN selection lists. Further, in an additional or optional aspect, the analysis component 306 can determine band selection options to control frequency bands that are to be searched per RAT. The transmission component 308 can transfer the updated RAT-PLMN combinations to the UE 102 via an OTA message communicated over the communication network 304. Based on the OTA message, the UE 102 can update the HPLMNwACT file stored in its SIM. In one aspect, on determining that the HPLMNwACT file has been updated, the UE 102 can initiate PLMN selection (e.g., via PLMN selection component 108).

Figure 4:
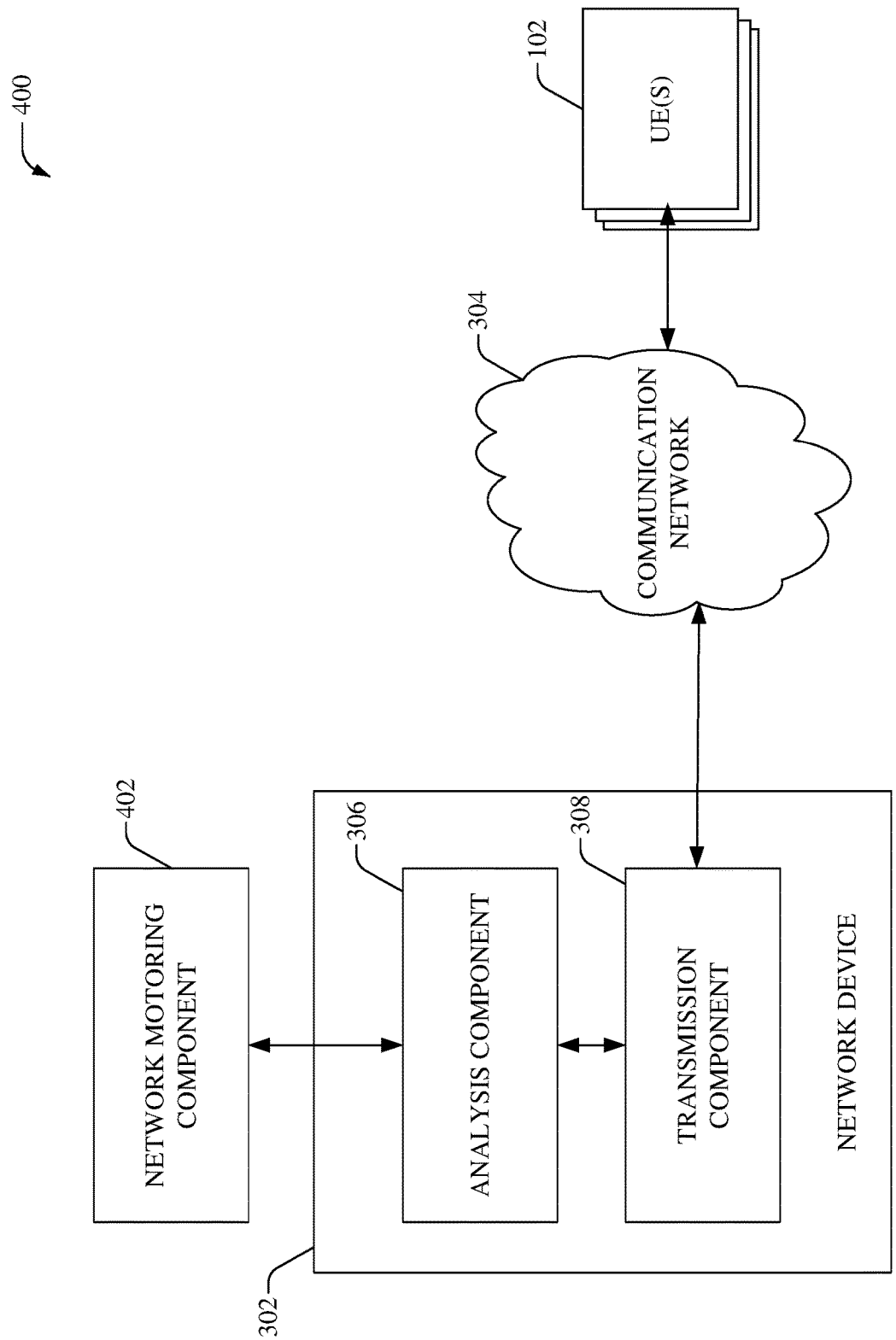
FIG. 4 illustrates an example system that facilitates load balancing based on network-triggered PLMN selection.

Referring now to FIG. 4, there illustrated is an example system 400 that facilitates load balancing based on network-triggered PLMN selection, according to an aspect of the subject disclosure. System 400 comprises a network monitoring component 402 that can track (and/or predict via machine learning) network usage and/or load across PLMNs and/or across RATs. In an aspect, the network monitoring component 402 can provide notifications and/or alerts to the analysis component 306, for example, when determined that network usage and/or load satisfies a defined criterion (e.g., exceeds a defined threshold, a defined traffic pattern is observed and/or predicted, etc.).

The analysis component 306 can utilize the received data to determine RAT-PLMN combinations that can be provided to a select group of UEs 102. For example, if two (or more) cells with different PLMNs are deployed within an area, both supporting same (or different) RATs, the network monitoring component 402 can determine loading of the cells and the analysis component 306 can initiate load balancing by steering a group of UEs from one PLMN to the other PLMN by updating the RAT-PLMN combinations stored within the HPLMNwACT file, via OTA messaging. In another example, if two (or more) cells with the same (or different) PLMNs but different RATs are deployed within an area, the network monitoring component 402 can determine loading of the cells and the analysis component 306 can initiate load balancing by steering a group of UEs from one RAT to the other RAT by updating the RAT-PLMN combinations stored within the HPLMNwACT file, via OTA messaging.

Typically, when a UE is powered on, it searches for its home network and once found, it remains camped on the HPLMN without further searching for other PLMNs. Oftentimes, in some areas an MNO can deploy two or more PLMNs that can be identified as home (e.g., EPLMNs). However, in this example scenario, once a UE initiatlly attached to a PLMN, it can remain coupled to cells of that PLMN. System 400 allows an MNO to provide OTA updated to change priority list of RAT-PLMN combinations and accordingly trigger a search and selection of other PLMN (e.g., to load balance across PLMNs and/or RATs).

Figure 5:
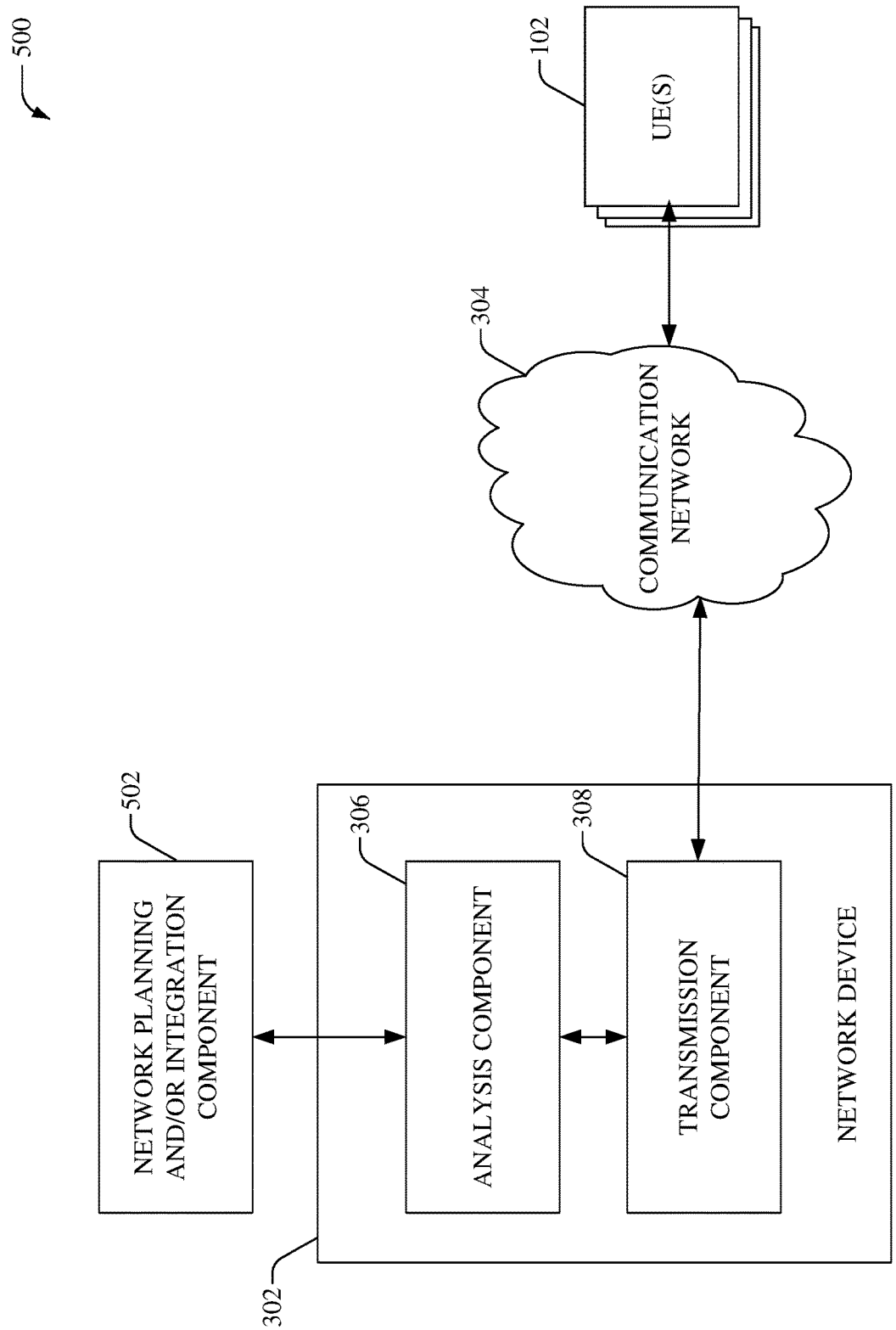
FIG. 5 illustrates an example system that facilitates device steering based on network-triggered PLMN selection.

Referring now to FIG. 5, there illustrated is an example system 500 that facilitates device steering based on network-triggered PLMN selection, according to an aspect of the subject disclosure. System 500 comprises a network planning and/or integration component 502 that can determine network planning and/or integration data (e.g., network acquisitions, shut down of legacy RATs, etc.) within a given geographical area. In an aspect, the network planning and/or integration component 502 can provide (e.g., periodically, on request, in response to determining an event, etc.) the determined data to the analysis component 306, which in turn can analyze the data to determine whether a priority list of RAT-PLMN combinations utilized by UE 102 for PLMN selection is to be updated.

For example, during network acquisition, the network planning and/or integration component 502 can determine that an MNO is still in process of integrating the new network into the MNO network, but wants users in the acquired areas to utilize devices with SIMs of the MNO network, the analysis component 306 can be utilized to adjust a priority of the RAT-PLMN combinations utilized by the devices, such that the acquired PLMN has a higher priority than the MNO's PLMN. Further, if the network planning and/or integration component 502 determines that the acquired network is fully integrated, the network planning and/or integration component 502 can notify the analysis component 306, which can then readjust the priority of the RAT-PLMN combinations utilized by the devices (e.g., to remove an entry associated with acquired PLMN). It is noted that acquisition of carriers can include international acquisitions, wherein the analysis component 306 can modify the priority of the RAT-PLMN combinations to prevent the UE from searching other roaming networks instead of the acquired network.

In another example, the network planning and/or integration component 502 can determine that the MNO no longer deploys and/or has shut down a specified RAT (e.g., 2G) in a defined area. In this example scenario, the network planning and/or integration component 502 can notify the analysis component 306, which can then instruct UEs within the defined area to remove entries associated with the specified RAT from the RAT-PLMN combinations (e.g., to avoid the UEs searching for the unavailable RAT).

Figure 6:
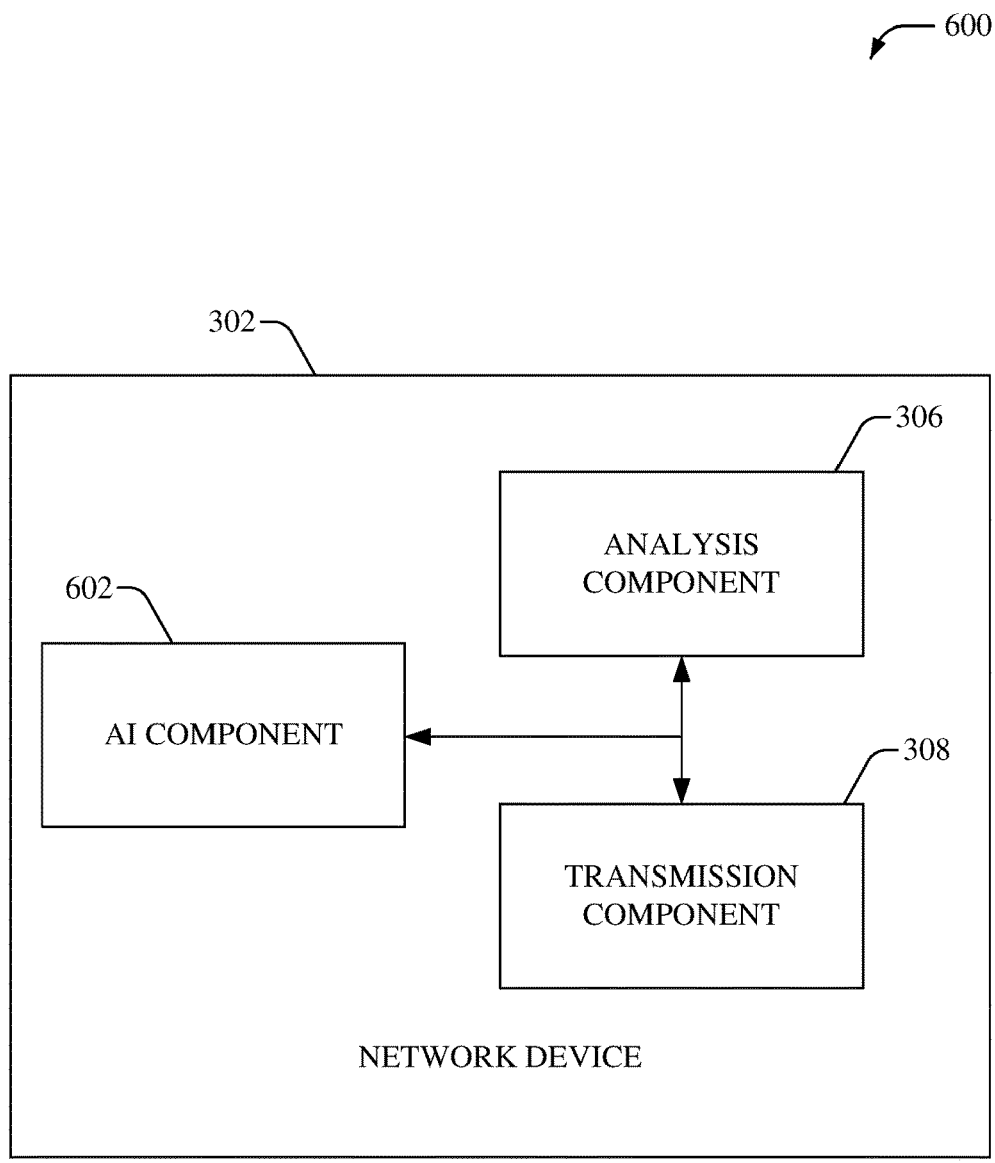
FIG. 6 illustrates an example system that automates one or more features in accordance with the subject embodiments.

Referring now to FIG. 6, there illustrated is an example system 600 that employs an artificial intelligence (AI) component 602 to facilitate automating one or more features in accordance with the subject embodiments. It can be noted that the network device 302, analysis component 306, and transmission component 308 can comprise functionality as more fully described herein, for example, as described above with regard to systems 300-500.

In an example embodiment, system 600 (e.g., in connection with automatically modifying RAT-PLMN lists) can employ various AI-based schemes (e.g., intelligent processing/analysis, machine learning, etc.) for carrying out various aspects thereof. For example, a process for determining which UEs are to be instructed to modify their RAT-PLMN list, classification of the UEs, the updates to a RAT-PLMN list, an interval during which the updates are to be applied, etc., can be facilitated via an automatic classifier system implemented by AI component 602.

Moreover, the AI component 602 can exploit various artificial intelligence (AI) methods or machine learning methods. Artificial intelligence techniques can typically apply advanced mathematical algorithms-e.g., decision trees, neural networks, regression analysis, principal component analysis (PCA) for feature and pattern extraction, cluster analysis, genetic algorithm, or reinforced learning—to a data set. In particular, AI component 602 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, comprising but not limited to determining according to a predetermined criteria, priorities of respective RAT-PLMN combinations within a PLMN selection file (e.g., HPLMNwACT) stored in the SIM, removal and/or addition of RAT-PLMN combinations within the PLMN selection file, a type of UE that is to be provided with the updated selection file, a time period during which the updates are provided, etc. The criteria can comprise, but is not limited to, historical patterns and/or trends, network operator preferences and/or policies, predicted traffic flows, event data, latency data, reliability/availability data, current time/date, service requirements/characteristics, real-time resource consumption, network planning, configuration, and/or integration data and/or trends, and the like.

Figure 7:
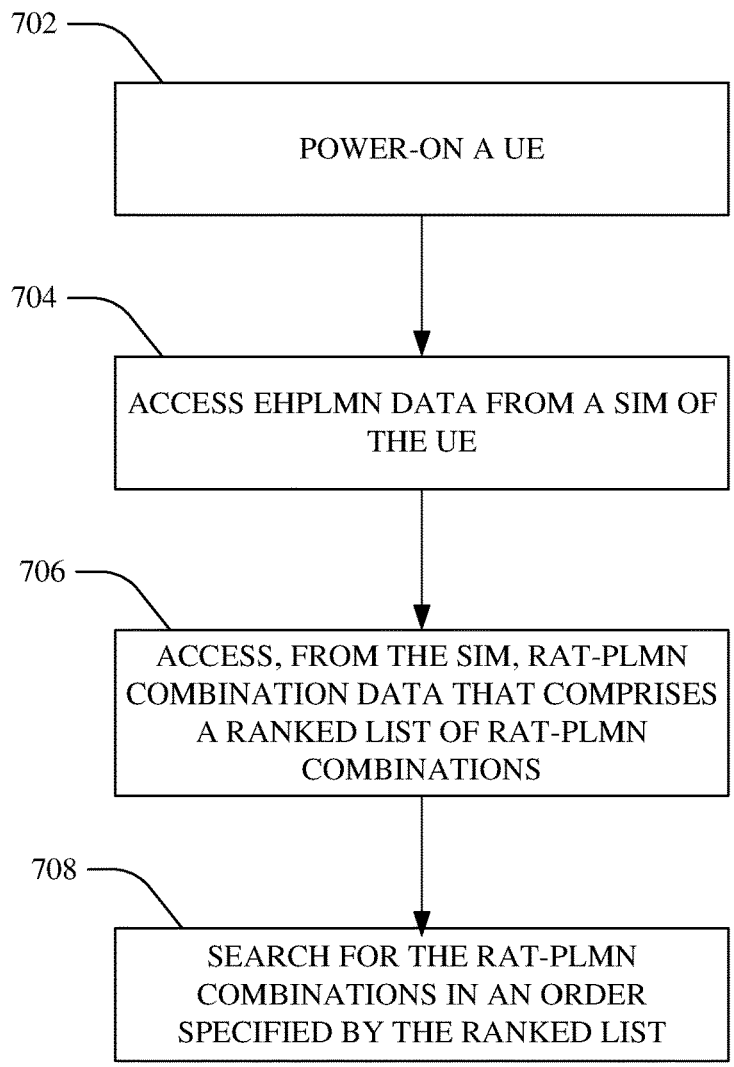
FIG. 7 illustrates an example method that facilitates optimized PLMN selection based on RAT-PLMN combination data stored within a UE's subscriber identity module (SIM).
Figure 8:
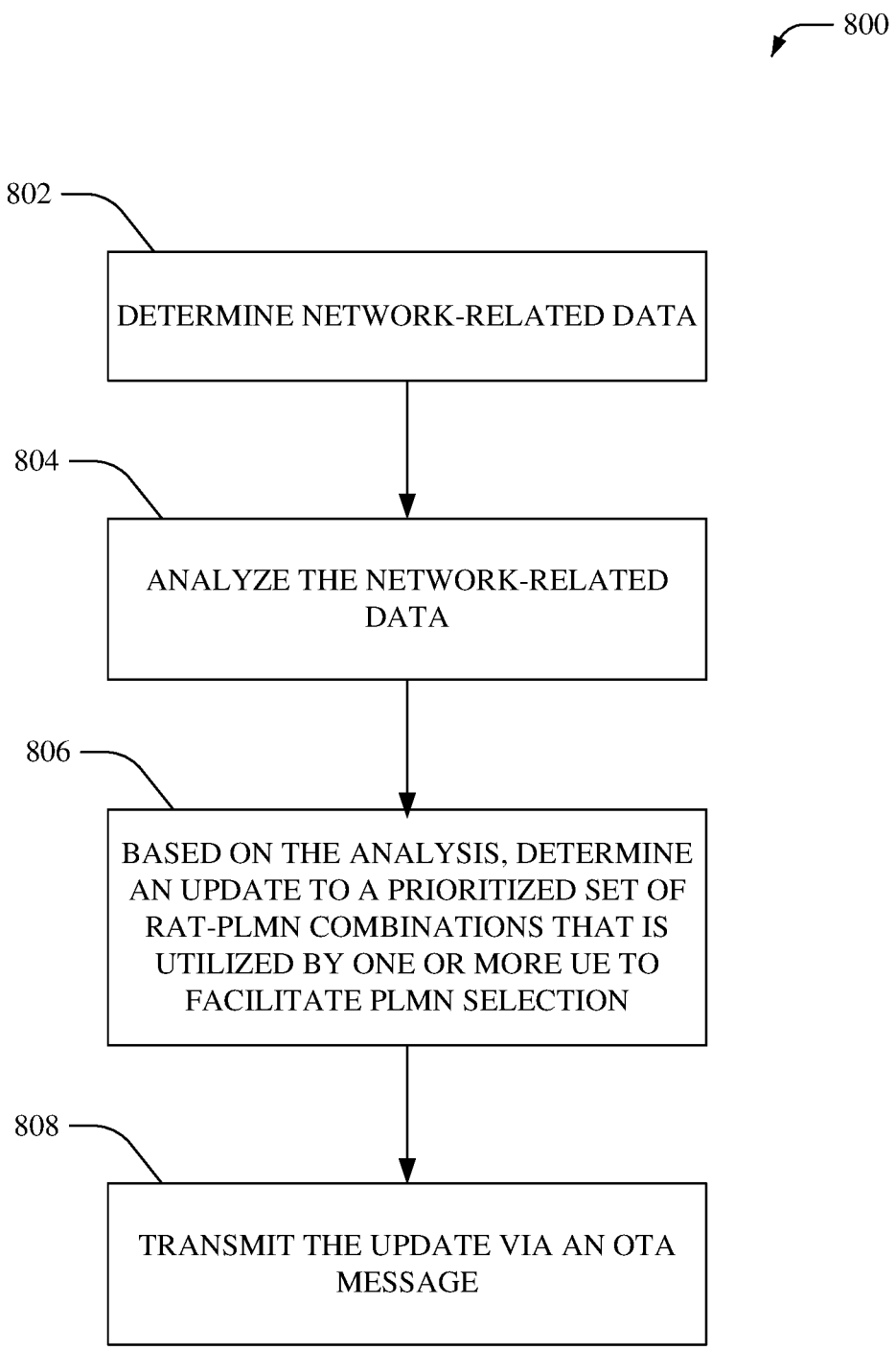
FIG. 8 illustrates an example method for controlling RAT-PLMN combinations that are utilized by a UE during PLMN selection.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates optimized PLMN selection based on RAT-PLMN combination data stored within the UE SIM, according to an aspect of the subject disclosure. In an aspect, method 700 can be implemented by one or more UE (e.g., UE 102) of a communication network (e.g., cellular network). At 702, the UE can power on. When the UE initiates a process to search for network connectivity, at 704, EHPLMN data can be accessed from the SIM. The EHPLM data comprises a ranked list of PLMNs that are to be treated as a home network PLMN (e.g., having higher priority that user-defined PLMNs and/or visitor PLMNs). Further, at 706, RAT-PLMN combination data can be accessed from the SIM, wherein the RAT-PLMN combination data can comprise a ranked list of RAT-PLMN combinations. As an example, the RAT-PLMN combination data can be stored within the HPLMNwACT file, which can be populated and/or updated based on one or more operator requirements.

Moreover, at 708, only the RAT-PLMNs are searched for in an order specified by the ranked list (e.g., ascending order of ranks). Moreover, PLMN searches are restricted to RAT-PLMN that are linked to each other.

FIG. 8 illustrates an example method 800 for controlling RAT-PLMN combinations that are utilized by a UE during PLMN selection, according to an aspect of the subject disclosure. As an example, method 800 can be implemented by one or more network devices (e.g., network device 302) of a communication network (e.g., cellular network). At 802, network-related data can be determined. As an example, the network-related data can comprise, but is not limited to, operator requirements and/or preferences, operator-defined policies, network usage and/or traffic patterns (e.g., observed and/or predicted), network acquisition, planning, configuration and/or integration data, etc. In one aspect, the network-related data can be collected from one or more network devices, for example, in a push or pull configuration.

At 804, the network-related data can be analyzed. Further, at 806, based on the analysis, an update to a prioritized set of RAT-PLMN combinations (e.g., HPLMNwACT file) that is utilized by one of more UEs to facilitate PLMN selection can be determined. As an example, the update can trigger PLMN selection to steer the UEs to a different RAT and/or PLMN for load balancing and/or to ensure circuit switched fallback is available. In another example, the update can enable quicker scanning for HPLMNs in border scenarios and/or in scenarios wherein a RAT and/or PLMN is unavailable within an area. Further, at 808, the update can be transmitted to the one or more UEs via an OTA message.

In one aspect, the systems 100-600 and methods 700-800 disclosed herein provide various non-limiting advantages, for example, (i) reduce search time to access a network during PLMN detection; (ii) extend battery life of a UE; (iii) reduce resource (memory and/or processing) consumption of the UE; (iv) quickly associate and disassociate access technologies from available networks in a deployment; (v) allow network operators to prioritize and/or manage RAT-PLMN combinations in the search process; etc.

Figure 9:
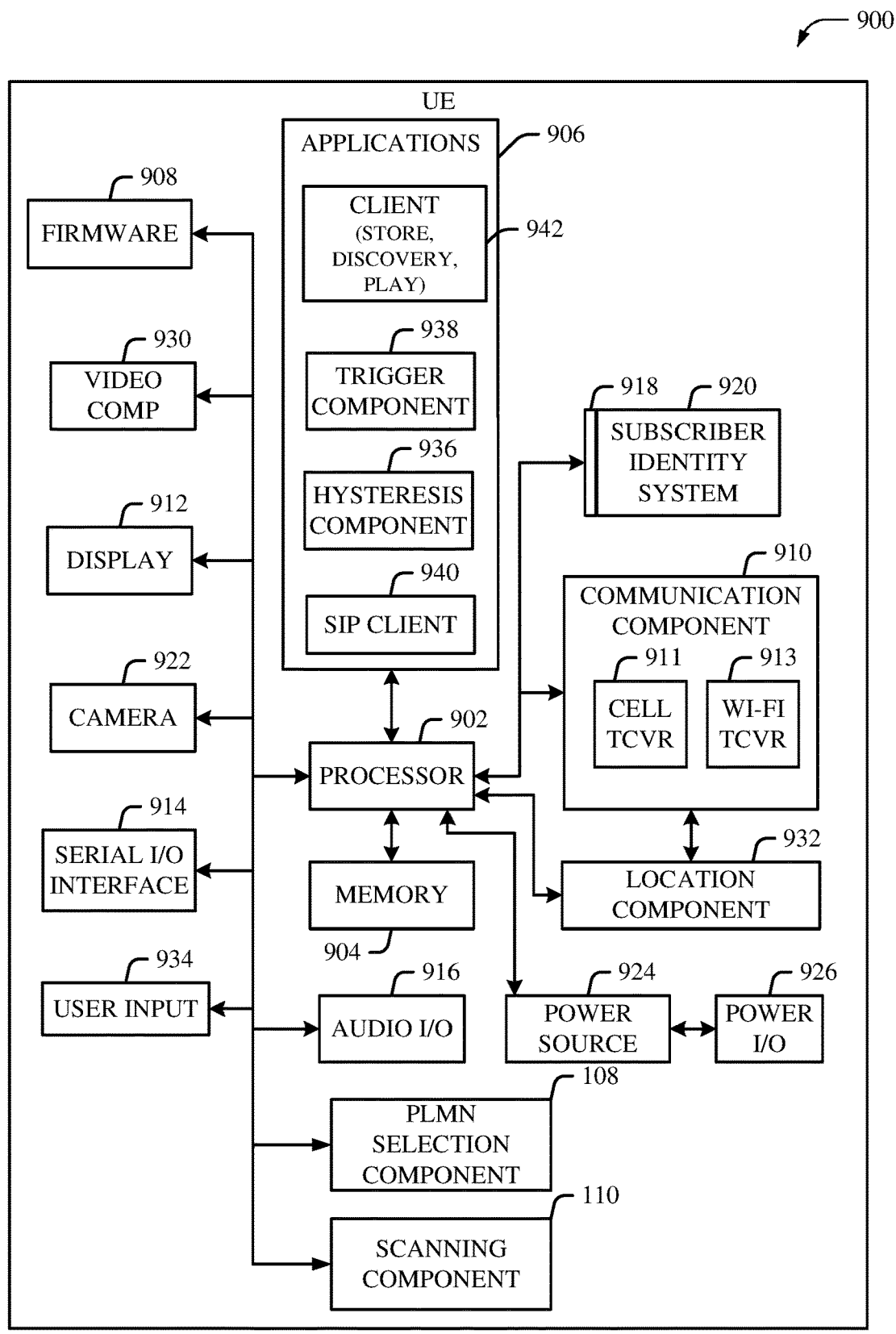
FIG. 9 illustrates an example block diagram of a user equipment operable to engage in a system architecture that facilitates wireless communications according to one or more embodiments described herein.

Referring now to FIG. 9, illustrated is an example block diagram of an example UE 900 operable to engage in a system architecture that facilitates wireless communications according to one or more embodiments described herein. UE 102 described herein is substantially similar to UE 900 and can comprise functionality as more fully, for example, as described herein with regard to UE 900.

The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

The UE includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908 and executed by the processor 902 from either or both the memory 904 or/and the firmware 908. The firmware 908 can also store startup code for execution in initializing the UE 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The UE 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The UE 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the UE 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The UE 900 can include a slot interface 918 for accommodating a SIC (Subscriber Identity Component) in the form factor of a card Subscriber Identity Module (SIM) or universal SIM 920 and interfacing the SIM card 920 with the processor 902. However, it is to be appreciated that the SIM card 920 can be manufactured into the UE 900, and updated by downloading data and software. The SIM card 920 described herein is substantially similar to SIM 104 and can comprise functionality as more fully, for example, as described herein with regard to SIM 104. For example, the SIM 920 can store the HPLMNwACT file 106 that can be updated based on operator prefernces and utilized to facilitate an efficient PLMN search.

The UE 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the UE 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The UE 900 also includes a power source 924 in the form of batteries and/or an AC power subsystem, which power source 924 can interface to an external power system or charging equipment (not shown) by a power I/O component 926.

The UE 900 can also comprise a video component 930 for processing video content received and, for recording and transmitting video content. For example, the video component 930 can facilitate the generation, editing and sharing of video quotes. A location-tracking component 932 facilitates geographically locating the UE 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the UE 900 to support SIP protocols and register the subscriber with the SIP registrar server. The applications 906 can also include a client 942 that provides at least the capability of discovery, play and store of multimedia content, for example, music.

The UE 900, as indicated above related to the communications component 910, includes an indoor network radio transceiver 913 (e.g., Wi-Fi transceiver). This function supports the indoor radio link, such as IEEE 802.11, for the dual-mode GSM UE 900. The UE 900 can accommodate at least satellite radio services through a UE that can combine wireless voice and digital radio chipsets into a single handheld device. Further, UE 900 can comprise the PLMN selection component 108 and the scanning component 110, which can comprise functionality as more fully described herein, for example, as described above with regard to systems 100-200.

Figure 10:
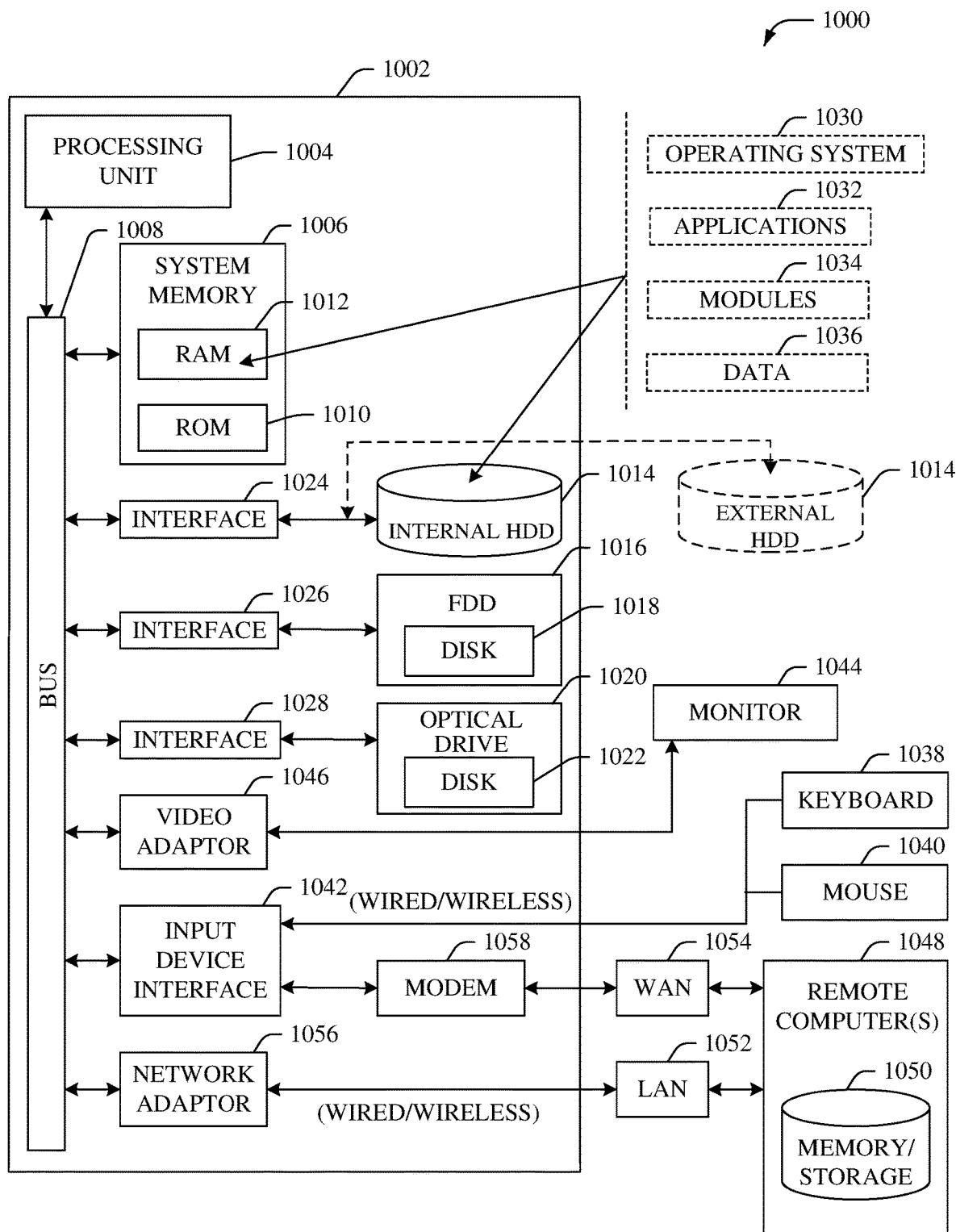
FIG. 10 illustrates a block diagram of a computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, applications (e.g., program modules) comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media. Combinations of the any of the above should also be included within the scope of computer-readable media.

With reference again to FIG. 10, the example environment 1000 for implementing various aspects of the specification comprises a computer 1002, the computer 1002 comprising a processing unit 1004, a system memory 1006 and a system bus 1008. As an example, the component(s), application(s) server(s), equipment, system(s), interface(s), gateway(s), controller(s), node(s), entity(ies), function(s), cloud(s) and/or device(s) (e.g., UE 102, PLMN selection component 108, scanning component 110, UE 1 202, UE 204, cells 2061-2063, network device 302, analysis component 306, transmission component 308, network monitoring component 402, network planning and/or integration component 504, AI component 602, UE 900, etc.) disclosed herein with respect to systems 100-600 and 900 can each comprise at least a portion of the computer 1002. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also comprise a wireless access point disposed thereon for communicating with the wireless adapter 1056.

When used in a WAN networking environment, the computer 1002 can comprise a modem 1058, or is connected to a communications server on the WAN 1054 or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
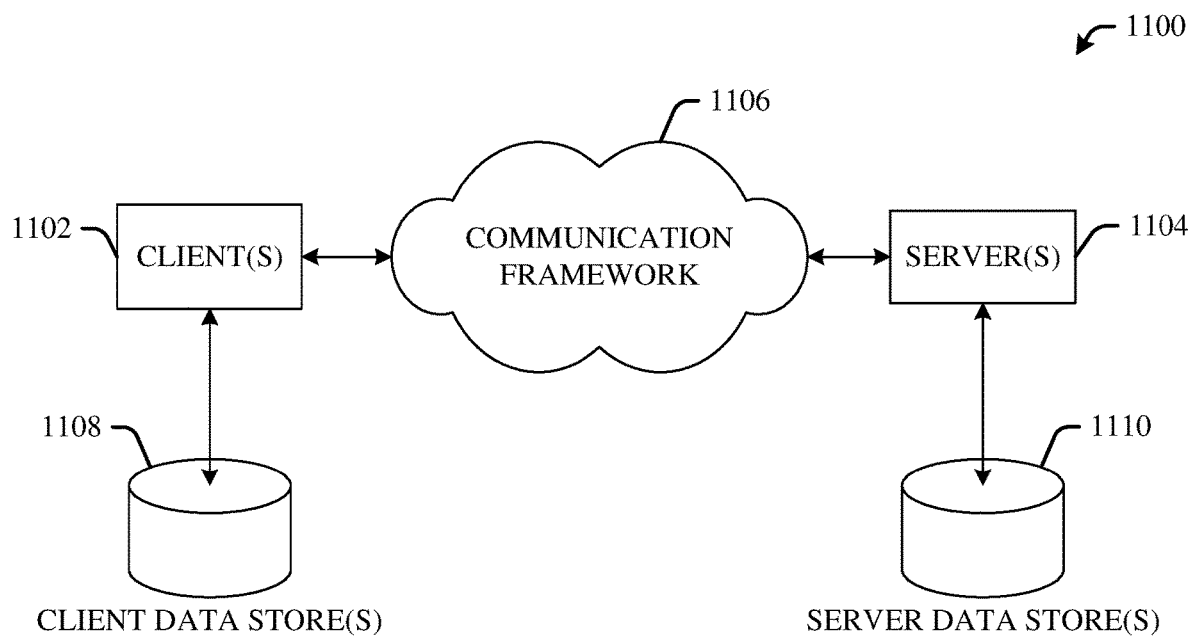
FIG. 11 illustrates a schematic block diagram of a computing environment in accordance with the subject specification

Referring now to FIG. 11, there is illustrated a schematic block diagram of a computing environment 1100 in accordance with the subject specification. The system 1100 comprises one or more client(s) 1102. The client(s) 1102 can be hardware and/or software (e.g., threads, processes, computing devices).

The system 1100 also comprises one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may comprise a cookie and/or associated contextual information, for example. The system 1100 comprises a communication framework 1106 (e.g., a global communication network such as the Internet, cellular network, etc.) that can be employed to facilitate communications between the client (s) 1102 and the server(s) 1104.

Communications can be facilitated via a wired (comprising optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
accessing a public land mobile network selector file stored within a subscriber identity module of a user equipment, wherein the public land mobile network selector file comprises combination data indicative of prioritized combinations of radio access technologies linked to public land mobile network identifiers, and wherein the combination data has been updated, based on a network operator preference, via over-the-air messaging;
based on the combination data, facilitating a search of the prioritized combinations for a combination associated with a home public land mobile network; and
receiving, from network equipment via the over-the-air messaging, update data that updates the public land mobile network selector file to an updated public land mobile network selector file, wherein the updated public land mobile network selector file comprises updated combination data indicative of updated prioritized combinations comprising, for each public land mobile network identifier of the public land mobile network identifiers, only one combination of a single radio access technology linked to the public land mobile network identifier, and wherein the update data is based on predicted network load information and network integration information, and the predicted network load information has been determined to exceed a threshold network load and conform substantially to a defined traffic pattern.

2. The system of claim 1, wherein the update data is employable to steer the user equipment to couple to an operator-selected access point device.

3. The system of claim 1, wherein the update data has been determined based further on classification data indicative of a type of the user equipment.

4. The system of claim 1, wherein, when an acquired network has been determined not to have been fully integrated within a network associated with the user equipment, the update data comprises priority data that assigns a higher priority to a first public land mobile network identifier of the acquired network than a second public land mobile network identifier of the network.

5. The system of claim 1, wherein the update data has been determined based further on network planning information indicative of a legacy radio access technology that has been shut down.

6. The system of claim 1, wherein the update data has been determined based further on availability data indicative of an availability of the radio access technologies within an area associated with the user equipment.

7. The system of claim 1, wherein, in response to an acquired network having been determined to have been fully integrated with a network associated with the user equipment, information associated with a first public land mobile network identifier of the acquired network is removed from the update data.

8. The system of claim 1, wherein the combination data has been customized based on a geographical location of the user equipment.

9. A method, comprising:
determining, by a user equipment comprising a processor, combination data from a public land mobile network selector file stored within a subscriber identity module of the user equipment, wherein the combination data is indicative of ranked combinations of radio access technologies that are linked to public land mobile network identifiers, and wherein the combination data has been generated based on network operator preference data that has been received via over-the-air messaging;
based on the combination data, initiating, by the user equipment, a scan of the ranked combinations for detection of a combination associated with a home public land mobile network; and
receiving, by the user equipment via the over-the-air messaging, update data that updates the public land mobile network selector file to an updated public land mobile network selector file, wherein the updated public land mobile network selector file comprises updated combination data indicative of updated ranked combinations comprising, for each public land mobile network identifier of the public land mobile network identifiers, only one combination of a single radio access technology linked to the public land mobile network identifier, and wherein the update data is based on predicted network load information and network integration information, and the predicted network load information has been determined to exceed a threshold network load and conform substantially to a defined traffic pattern.

10. The method of claim 9, wherein the receiving comprises receiving the update data that has been determined based on network planning information.

11. The method of claim 9, wherein the scan comprises searching only for the combination of the radio access technologies and the public land mobile network identifiers in an order that is specified by the combination data.

12. The method of claim 9, wherein the combination data has been customized based on a type of the user equipment.

13. The method of claim 9, wherein the combination data has been customized based on a geographical location of the user equipment.

14. The method of claim 9, wherein the combination data has been customized based on a traffic pattern associated with the user equipment.

15. The method of claim 9, further comprising, in response to an acquired network having been determined to have been fully integrated with a network associated with the user equipment, removing, by the user equipment, information associated with a first public land mobile network identifier of the acquired network from the update data.

16. The method of claim 9, further comprising employing, by the user equipment, the update data to couple to an operator-selected network equipment.

17. A non-transitory machine-readable medium, comprising executable instructions that, when executed by a processor, facilitate performance of operations, comprising:
determining combination data from a public land mobile network selector file stored within a subscriber identity module of a user equipment, wherein the combination data is indicative of ranked combinations of radio access technologies that are linked to public land mobile network identifiers, and wherein the combination data has been generated based on network operator preference data that has been received via over-the-air messaging;

based on the combination data, initiating a scan of the ranked combinations to detect a combination associated with a home public land mobile network; and receiving, from network equipment via the over-the-air messaging, update data that updates the public land mobile network selector file to an updated public land mobile network selector file, wherein the updated public land mobile network selector file comprises updated combination data indicative of updated ranked combinations comprising, for each public land mobile network identifier of the public land mobile network identifiers, only one combination of a single radio access technology linked to the public land mobile network identifier, and wherein the update data is based on predicted network load information and network integration information, and the predicted network load information has been determined to exceed a threshold network load and conform substantially to a defined traffic pattern.

18. The non-transitory machine-readable medium of claim 17, wherein the combination data has been customized based on a type of the user equipment.

19. The non-transitory machine-readable medium of claim 17, wherein the combination data has been customized based on a geographical location of the user equipment.

20. The non-transitory machine-readable medium of claim 17, wherein the combination data has been customized based on a traffic pattern associated with the user equipment.

* * * * *